(12) United States Patent  (10) Patent No.: US 8,819,013 B2
Buryak et al.  (45) Date of Patent: Aug. 26, 2014

(54) CUSTOMER SUPPORT SOLUTION RECOMMENDATION SYSTEM

(71) Applicant: Google Inc., Mountain View, CA (US)

(72) Inventors: Kirill Buryak, Sunnyvale, CA (US); Glenn Lewis, Costa Mesa, CA (US); Nadav Benbarak, Cambridge, MA (US); Aner Ben-Artzi, Los Angeles, CA (US); Jun Peng, San Ramon, CA (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 13/666,811

(22) Filed: Nov. 1, 2012

(65) Prior Publication Data

US 2013/0117267 A1    May 9, 2013

(30) Foreign Application Priority Data

Nov. 3, 2011 (IL) .......................................... 216118

(51) Int. Cl.
*G06F 17/30* (2006.01)

(52) U.S. Cl.
CPC .... *G06F 17/30011* (2013.01); *G06F 17/30029* (2013.01); *G06F 17/30038* (2013.01)
USPC ........... 707/736; 707/737; 707/732; 707/733; 707/734; 707/754; 707/752

(58) Field of Classification Search
CPC .................... G06F 17/30011; G06F 17/30029; G06F 17/30038
USPC .................. 707/732–734, 736, 737, 752, 754
See application file for complete search history.

(56) References Cited

U.S. PATENT DOCUMENTS

| | | | |
|---|---|---|---|
| 5,867,799 A * | 2/1999 | Lang et al. ............................. | 1/1 |
| 7,418,444 B2 | 8/2008 | Flank et al. | |
| 7,552,365 B1 * | 6/2009 | Marsh et al. ................. | 714/47.2 |
| 7,571,355 B2 | 8/2009 | Shabalin | |
| 2003/0028448 A1 | 2/2003 | Joseph et al. | |
| 2003/0050908 A1 | 3/2003 | Kreulen et al. | |
| 2006/0100998 A1 | 5/2006 | Edwards et al. | |

(Continued)

FOREIGN PATENT DOCUMENTS

WO    2006002336 A2    1/2006

OTHER PUBLICATIONS

Office Action of Israeli Patent Application No. 216118; Aug. 14, 2013; 4 pages (with English translation).

(Continued)

*Primary Examiner* — Frantz Coby
(74) *Attorney, Agent, or Firm* — Armstrong Teasdale LLP (57) ABSTRACT

Methods, systems, and apparatus, including computer programs encoded on a computer-readable storage medium and a method for automatically providing support solutions in response to user feedback items. The method comprises receiving user feedback items and corresponding support solutions. The method further comprises identifying, using clustering techniques, associations between the user feedback items and the corresponding support solutions. The method further comprises storing the identified associations as an items-solutions model that correlates the user feedback items with the corresponding support solutions. The method further comprises receiving a new user feedback item. The method further comprises automatically determining, using the items-solutions model, at least one support solution that corresponds to the new user feedback item. The method further comprises providing the at least one support solution in response to the received new user feedback item.

20 Claims, 4 Drawing Sheets

(56) References Cited

U.S. PATENT DOCUMENTS

| | | |
|---|---|---|
| 2009/0222313 A1 | 9/2009 | Kannan et al. |
| 2009/0276368 A1 | 11/2009 | Martin et al. |
| 2010/0198596 A1 | 8/2010 | Bhardwaj et al. |
| 2012/0095863 A1* | 4/2012 | Schiff et al. ............. 705/26.7 |
| 2012/0249461 A1* | 10/2012 | Flanagan et al. ............. 345/173 |

OTHER PUBLICATIONS

IL Office Action and Search Report for application No. 216118; Oct. 15, 2012; 5 pages.

* cited by examiner

CUSTOMER SUPPORT SOLUTION RECOMMENDATION SYSTEM

CROSS REFERENCE TO RELATED APPLICATIONS

This application claims the benefit of Israeli Patent Application No. 216118 filed Nov. 3, 2011, which is hereby incorporated by reference in its entirety.

BACKGROUND

This specification relates to information presentation.

The Internet provides access for users to a wide variety of resources. For example, video and/or audio files, as well as web pages for particular subjects or particular news articles, are accessible over the Internet. Additionally, users who are content sponsors may use the Internet to access resources such as advertising interfaces or other web sites. If a user encounters a problem (e.g., "cannot login," "lost password," etc.) while using a resource, the user can generate and send an email or some other form of user feedback communication regarding the issue to a support center associated with the resource. The support center may receive thousands or millions of user feedback items during a typical month or year. Many of the user feedback items can be related, or may be the exact same issue, and many of the responses (or solutions) by the support center may be similarly related.

SUMMARY

In general, one innovative aspect of the subject matter described in this specification can be implemented in methods that include a method for automatically providing support solutions in response to user feedback items. The method comprises receiving user feedback items and corresponding support solutions. The method further comprises identifying, using clustering techniques, associations between the user feedback items and the corresponding support solutions wherein using clustering techniques includes filtering a corpus of user feedback items against a domain-specific dictionary. The method further comprises storing the identified associations as an items-solutions model that correlates the user feedback items with the corresponding support solutions. The method further comprises receiving a new user feedback item. The method further comprises automatically determining, using the items-solutions model, at least one support solution that corresponds to the new user feedback item. The method further comprises providing the at least one support solution in response to the received new user feedback item.

These and other implementations can each optionally include one or more of the following features. Storing the identified associations can further comprise identifying groups of related user feedback items sharing a support solution. Identifying groups of related user feedback items sharing a support solution can include applying a term frequency analysis to the user feedback items and the support solutions to develop a mapping between user feedback items and one or more best-mapped support solutions. The support solutions can comprise predetermined responses. The predetermined responses can be organized by product and issue. The predetermined responses can represent a library of most frequently presented solutions to customer problems presented in the user feedback items. One or more support solutions can comprise a templatized message to a customer, describing a step-by-step solution to a specific customer problem. The templatized message can be an email message. The templatized message can comprise one or more placeholders to be filled based on attributes of a specific customer. The method can further comprise receiving a new user feedback item, automatically determining a solution to the new user feedback item using the items-solutions model, and providing the determined solution responsive to the new user feedback item. The method can further comprise receiving a new user feedback item, automatically determining one or more proposed solutions to the new user feedback item using the items-solutions model, and providing the determined one or more proposed solutions. Automatically determining the one or more proposed solutions can include determining a confidence score associated with each of the one or more proposed solutions and ranking the one or more proposed solutions by their confidence scores, where providing the determined one or more proposed solutions includes providing the one or more proposed solutions that have highest-ranked confidence scores. Providing the determined one or more proposed solutions can include providing, to a user, a description of the one or more proposed solutions; receiving, from the user, a selection of at least one solution from the one or more proposed solutions; and providing, in response to the received new user feedback item, the user-selected at least one solution.

In general, another innovative aspect of the subject matter described in this specification can be implemented in systems that include a system for automatically providing support solutions in response to user feedback items. The system comprises a category engine for producing domain-specific categories using a corpus of user feedback items and a domain-specific dictionary. The system further comprises an association engine for receiving user feedback items and corresponding support solutions; identifying, using clustering techniques and the domain-specific categories, associations between the user feedback items and the corresponding support solutions; and storing the identified associations as an items-solutions model that correlates the user feedback items with the corresponding support solutions. The system further comprises a solution engine for receiving a new user feedback item; automatically determining, using the items-solutions model, at least one support solution that corresponds to the new user feedback item; and providing the at least one support solution in response to the received new user feedback item.

In general, another innovative aspect of the subject matter described in this specification can be implemented in computer program products that include a computer program product tangibly embodied in a computer-readable storage device and comprising instructions that, when executed by a processor, perform a method for providing content. The method comprises receiving user feedback items and corresponding support solutions. The method further comprises identifying, using clustering techniques, associations between the user feedback items and the corresponding support solutions. The method further comprises storing the identified associations as an items-solutions model that correlates the user feedback items with the corresponding support solutions. The method further comprises receiving a new user feedback item. The method further comprises automatically determining, using the items-solutions model, at least one support solution that corresponds to the new user feedback item. The method further comprises providing the at least one support solution in response to the received new user feedback item.

These and other implementations can each optionally include one or more of the following features. Storing the identified associations can further comprise identifying groups of related user feedback items sharing a support solution. Identifying groups of related user feedback items sharing a support solution can include applying a term frequency analysis to the user feedback items and the support solutions to develop a mapping between user feedback items and one or more best-mapped support solutions. The support solutions can comprise predetermined responses. The predetermined responses can be organized by product and issue. The predetermined responses can represent a library of most frequently presented solutions to customer problems presented in the user feedback items.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems, methods and techniques for automatically recommending support solutions for user feedback items within environments having large numbers of user feedback items. For example, an online support center (e.g., a web site that handles customer problems for an online product or service) can receive millions of items of user/customer feedback (e.g., problems, issues, questions, comments, etc.) per month over a variety of different communication channels. Example communication channels include e-mail, chat, help forums, messaging platforms, message boards, postings, dislike indications, or telephone calls. In some implementations, automated processes can be used to organize and understand the corresponding high level of volume of customer feedback items. Some implementations can include a number of automated, machine learning-based methods that cluster and categorize customer feedback and the corresponding solutions. Clustering techniques can include filtering a corpus of user feedback items against a domain-specific dictionary. For example, clusters can be used to aggregate solutions by groups of related issues. Information provided by the clusters can then be used, for example, to automatically identify a solution for a new issue using solutions that previously have been used to solve instances of the same or similar issues.

In some implementations, automatically providing solutions can completely eliminate or significantly reduce the need for human involvement in the solution, e.g., by requiring little or no action by customer support, help desk or other support personnel to provide solutions. In some implementations, some customer queries may still need to be manually processed and answered, e.g., by customer support representatives (CSRs). The proposed systems and methods can be used to support the CSRs. For example, the CSRs can select one or more solutions from an automatically-generated set of proposed or recommended solutions. The CSR can select one or more appropriate solutions from the automatically-generated list and forward the solutions to the customer.

In some implementations, the selection of clusters can depend on categories of domain-specific features (e.g., words and phrases). Example domains include online advertising systems, online stores, auction houses, and so on. In some implementations, domain-specific features can be determined by filtering a corpus of user feedback items against a domain-specific dictionary. For example, to create categories of domain-specific features (e.g., "ad," "campaign," "creative," "keyword," etc.) for an online advertising system, the customer feedback for the online advertising system can be filtered using a dictionary of terms (e.g., key terminology items) specific to online advertising systems. In some implementations, such domain-specific dictionaries can be compiled automatically from product documentation including, for example, help center documents, user documentation, a corpus of past user communications (e.g., email), and so on.

Another example source of documents for compiling a domain specific dictionary is a repository of auto-respond e-mails, e.g., containing predefined solutions for most frequently-occurring customer problems. This can be a good source of product-specific terminology because predefined solutions usually contain key terminology for solving customer problems that are specific to a given product.

Some implementations can use an additional or alternative model of customer support by phone. For example, an asynchronous model can be used in which a customer can leave a voice message describing their problem or question. Then, later (e.g., within the hour or that same day), the customer can receive personalized help over e-mail, SMS, or some other preferred channel of communication. The personalized help can be generated, for example, after automatically processing the voice message.

For example, in one sequence of events, instead of making the customer wait on hold (e.g., to talk to a live person), the call center system can offer an option to leave a voice message. In some implementations, the option can include triggering a recording (e.g., played to the customer) that prompts the customer to include customer identification and a brief description of the problem or question. In some implementations, the system can use speech recognition software to transcribe the customer's voice message into text.

In some implementations, unsupervised and supervised machine learning classification techniques can be used to process the text created from the voice message in order to classify the problem or question. For example, the system can automatically identify the specific product issue the customer is inquiring about, as well as assign a numeric degree of confidence that is associated with the classification of the issue (e.g., 85% certain that the problem involves "Logging into Product X"). In some implementations, e.g., using supervised machine leaning, a user (e.g., call center personnel) can provide input into the process such as to review and select one or more of the automatically-generated classifications.

Continuing with the example, based on the classification determined for the customer issue, and provided that the corresponding degree of confidence of the classification is above a predefined quality threshold (e.g. 80% or higher), the system can automatically recommend potential solutions to the customer. For example, the proposed solution(s) can be delivered back to the customer over e-mail, SMS text, or some other preferred method.

In some implementations in which the voice message can be received in any one of multiple languages, language detection can be performed automatically by the speech recognition system. For example, if a customer in Paris leaves a message in French, the speech recognition system can detect French as the language. In some implementations, the speech recognition system can generate text in French and automatically convert the text to English in order to help to identify the correct classification.

Figure 1:
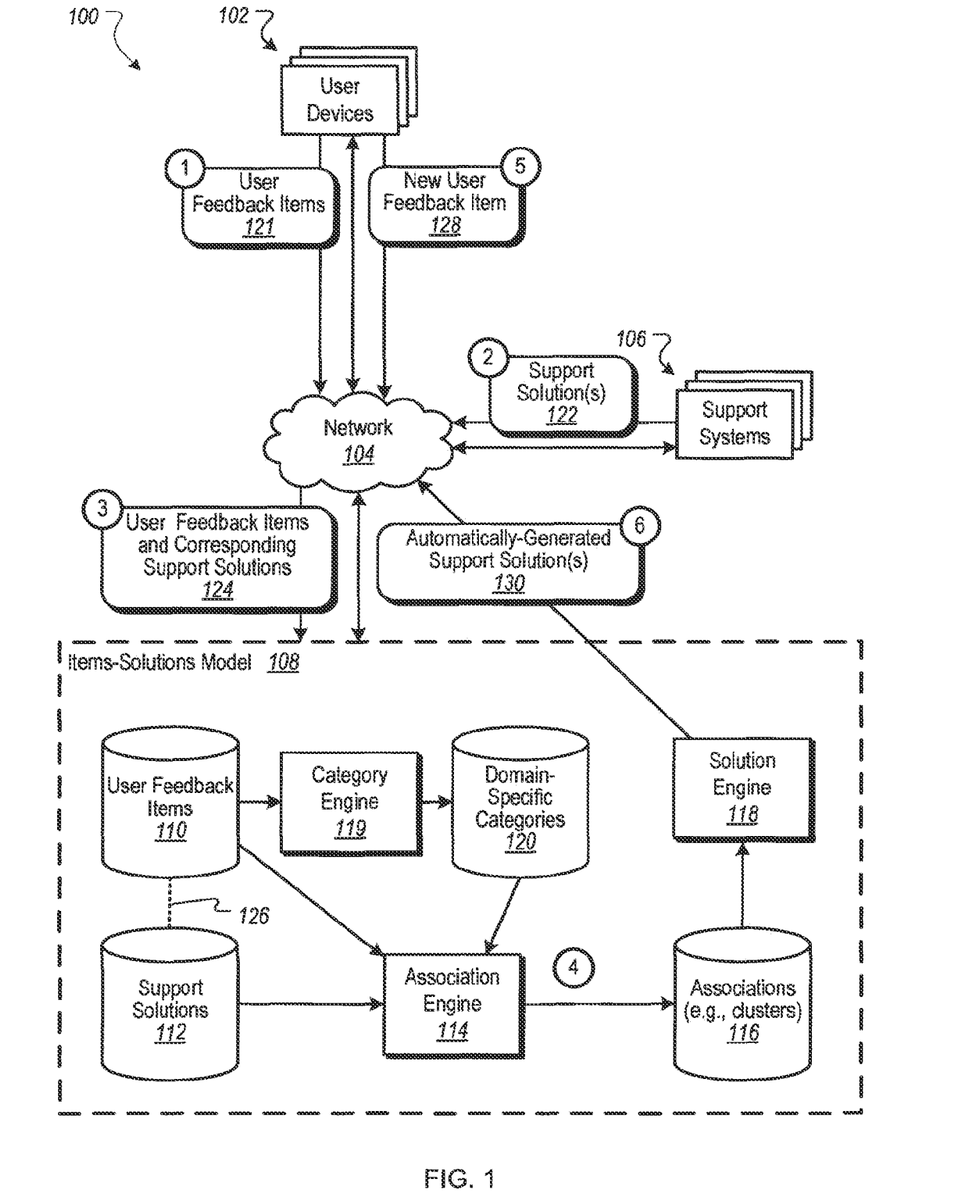
FIG. 1 is a diagram of an example environment for providing support solutions in response to user feedback items.

FIG. 1 is a diagram of an example environment 100 for providing support solutions in response to user feedback items. The environment 100 includes user devices 102 (e.g., from which the user feedback items originate) that are communicatively connected, through a network 104, with support systems 106 and an items-solutions model 108. The user devices 102, for example, can be used by users who access online resources, such as resources that are supported by the support systems 106. The user devices 102 can also host web browsers (e.g., by which users can access the resources) and other applications (e.g., email) for submitting user feedback items. The support systems 106 can include one or more online service/support entities, such as online advertising systems, online stores, auction houses, etc. The network 104 can include any combination of the Internet, local area networks (LANs), wide area networks (WANs), and other networks. Interactions that occur between the user devices 102 and the support systems 106, including information about support solutions used for particular user feedback items, can be used to generate information that is stored in the items-solutions model 108.

In some implementations, the items-solutions model 108 can include data stores of past user feedback items 110 and support solutions 112 which, in combination, can be used by an association engine 114 to produce and store associations 116. For example, the association engine 114 can use clustering techniques to create clusters in the associations 116 that include clusters representing groups of related user feedback items 110 that share support solutions 112. A solution engine 118 can then use the associations 116 to automatically generate one or more solutions for a new user feedback item that is processed by the items-solutions model 108.

In some implementations, the support solutions 112 can include predetermined responses (e.g., organized by product and issue) that represent a library or repository of most frequently-presented solutions to customer problems presented in the user feedback items. For example, one or more predetermined responses can exist for login/password issues related to a particular online advertising system.

In some implementations, the one or more support solutions can include a templatized message to a customer, describing a step-by-step solution to a specific customer problem. For example, a templatized message for password/login problems can include multiple steps or points to consider. A template that is used in this example can have the common text, such as an email form, that includes text and/or other content that is common to all instances of the particular problem. The template can also include placeholders for particular fields and information in the form that can then be filled in as part of the response, e.g., based on attributes of the specific customer and the particular problem. For example, the placeholders can be used to fill in the user's name, particular information for the current instance of the password/login problem, identification of the product (e.g., "Example Advertising System"), and so on. In some implementations, template messages can be in the form of an email message or some other message format (e.g., an SMS text, a voice message, etc.)

In some implementations, a category engine 119 can produce domain-specific categories 120. For example, a domain can comprise one or more advertising system products, and the feature set can include words and phrases that are specific to the advertising system products domain. By using the categories, the associations 116 that are produced by the association engine 114 can be more focused to the domain.

In one example flow shown in FIG. 1, any number of user devices 102 can provide user feedback items 121 (stage 1). This can occur continuously over time, e.g., as each user submits a user feedback item 121 for their particular problem or issue (e.g., with an online advertising system). For example, the users can use email or other interfaces on the user devices 102 to submit their user feedback items 121. The support system 106 (e.g., for the online advertising system) can receive the user feedback items 121 and generate one or more support solutions 122 (stage 2). The support system 106 can provide the support solutions 122 to the particular user device 102 that submitted the particular user feedback item 121 to which the support solutions 122 apply.

At the same time or thereafter, the items-solutions model 108 can receive user feedback items and corresponding support solutions 124 for storage as user feedback items 110 and support solutions 112 (stage 3). Further, as indicated by connection line 126, information stored in the user feedback items 110 and/or the support solutions 112 can include information that identifies what support solution(s) correspond to each user feedback item. Stages 1-3 can repeat several times (e.g., hundreds, thousands or more) over time as additional user feedback items 121 are presented, and support solutions 122 are provided in response.

Continuing with the current example flow, the association engine 114 can use clustering techniques to build clusters representing associations among related user feedback items 110 (stage 4). For example, the association engine 114 can store the clusters and any other information (e.g., including information identifying the solutions 112 that correspond to the user feedback items 110) in the associations 116. Conventional clustering techniques can be used to cluster the user feedback items. In some implementations, the clustering techniques can utilize a high-quality text clustering algorithm, such as the distributed exchange algorithm, in which the clustering can produce an arrangement of user feedback items that have the maximum number of keywords in common within each cluster, and therefore a high probability of describing the same specific topic.

In some implementations, clusters representing associations among related user feedback items can also effectively cluster the corresponding solutions of user feedback items. This can occur, for example, because proposed solutions for a user feedback item are often embedded in the e-mail threads as predetermined responses, e.g., as links to help center articles, help forum posts, etc. In some implementations, multiple solutions for a given problem can be clustered together as a result of e-mail thread clustering. In some implementations, the clusters can be used to enhance the items-solutions model 108, e.g., with one-to-many links from a user feedback item to multiple possible solutions. This can facilitate the selection of a best solution among a variety of possible solutions for a given problem. In some implementations, the possible solutions can be ranked based on the frequency of their occurrence, or based on other signals, such as customer satisfaction surveys. In some implementations, more than one solution can be offered to the customer, e.g., with a recommendation to try them in sequence, in case the first one does not work.

At some later time, such as after the items-solutions model 108 is populated, a user device 102 can generate a new user feedback item 128 (stage 5). In some implementations, the support systems 106 can receive the new user feedback item 128 and automatically access the items-solutions model 108 to attempt to identify a solution that corresponds to the new user feedback item 128. In some implementations, the solution engine 118 can access the associations 116 and provide one or more automatically-generated support solutions 130 to the user device 102 (stage 6).

In some implementations, each support system 106 can host its own items-solutions model 108. For example, the user feedback items 110 and support solutions 112 can be local to the support system 106, which can update each with user feedback items 121 that are received and the support solutions 122 that are generated in response. Moreover, the solution engine 118, which can also be local to the support system 106, can be invoked for each user feedback item 121 received in order to automatically generate recommended solutions based on associations between past user feedback items and resulting support solutions.

Figure 2:
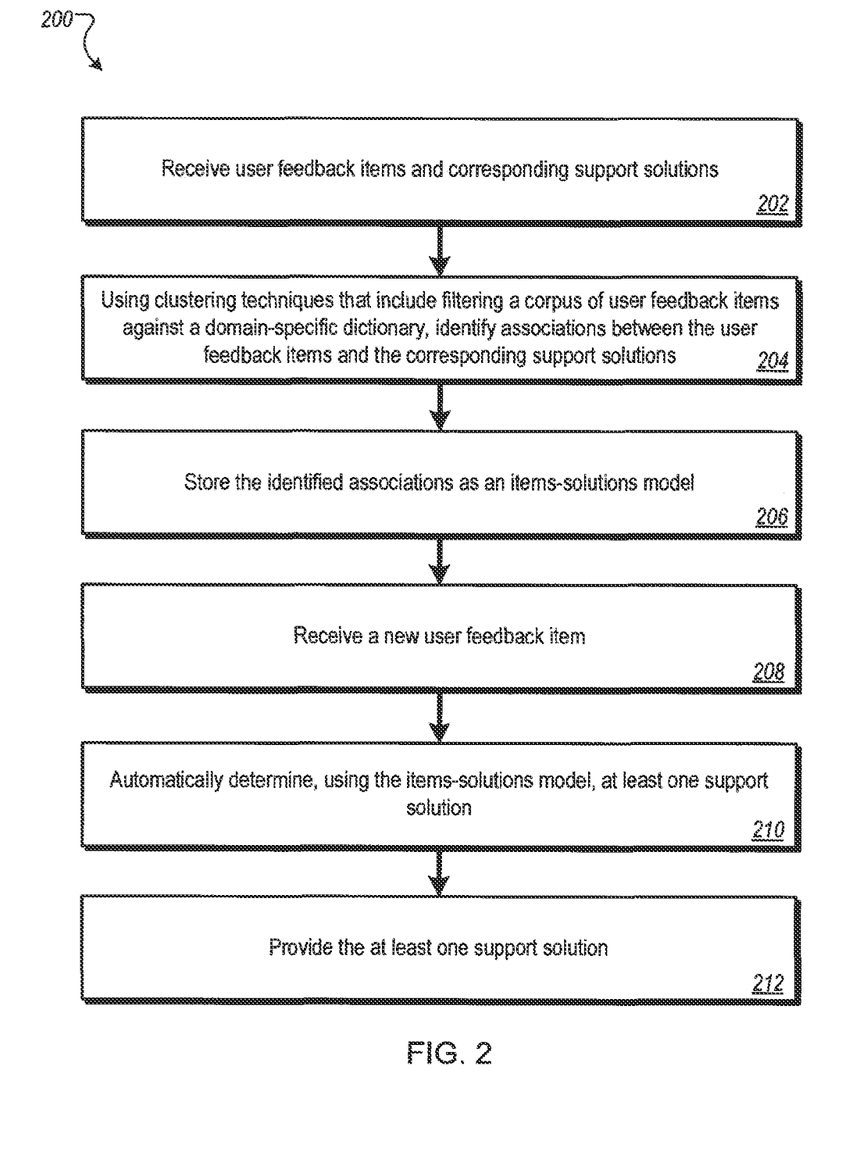
FIG. 2 is a flow chart of an example process for creating an items-solutions model and using the model to automatically determine solutions.

FIG. 2 is a flow chart of an example process 200 for creating an items-solutions model and using the model to automatically determine solutions. The process 200 includes stages that can be implemented as instructions and executed by one or more processors in one or more computer systems. In some implementations, the process 200 can be performed by the support systems 106, the association engine 114, and the solution engine 118. FIG. 1 is used for examples for the stages of the process 200.

User feedback items and corresponding support solutions are received (202). As an example, the support system 106 can receive user feedback items 121 from the user devices 102. The user feedback items 121 can include, over time, many (e.g., hundreds, thousands or more) instances of problems including "cannot login," "lost password," etc. In response, the support systems can generate support solutions 122, which can be sent to the user devices 102. Support solutions 122 can include solutions, for example, for each of the problems that include "cannot login," "lost password," and so on. At the same time or thereafter, the items-solutions model 108 can receive the user feedback items and corresponding support solutions 124 for storage as user feedback items 110 and support solutions 112.

Using clustering techniques that include filtering a corpus of user feedback items against a domain-specific dictionary, associations between the user feedback items and the corresponding support solutions are identified (204). For example, the association engine 114 can identify associations (e.g., using clustering techniques) using the user feedback items 110 and support solutions 112 and store the associations 116. The clustering techniques, for example, can include filtering a corpus of user feedback items, such as emails, etc., against a domain-specific dictionary. The domain-specific dictionary, for example, can be derived from documents that correspond to a domain (e.g., call center manuals for an online advertising system), including a search of the documents to identify most commonly-occurring words or phrases. The associations can identify groups of related user feedback items that share common support solutions. Details of clustering techniques are described below with reference to FIG. 3. Example results of the clustering can include combining user issues such as "cannot login," "lost password" and others into one or more clusters because the problems and/or the corresponding solutions are related. For example, user feedback issues related to "cannot login," "lost password" and "password expired" can be included in a cluster corresponding to "cannot login"/"lost password" or "login issues."

In some implementations, identifying the associations can include applying a term frequency analysis to the user feedback items and the support solutions to develop a mapping between user feedback items and one or more best-mapped support solutions. For example, for a group of user feedback items 110 that include issues such as "cannot login" and "lost password," there can be one or more support solutions 112 that solve those issues. Examples solutions can include inquiring whether "Caps Lock" is on, providing steps for re-setting a password, providing password hints, and so on.

The identified associations are stored as an items-solutions model that correlates the user feedback items with the corresponding support solutions (206). As an example, the association engine 114 can store the associations in the data store of associations 116. In some implementations, the associations can be stored as clusters.

A new user feedback item is received (208). As an example, after the items-solutions model 108 is generated, the support system 106 can receive a new user feedback item 128, such as a problem with a description of "cannot login," "lost password," "how do I modify targeting keywords?" or some other issue.

At least one support solution that corresponds to the new user feedback item is automatically determined using the items-solutions model (210). For example, using a description such as "cannot login" for a new user feedback item 128, the solution engine 118 can look up the one or more proposed solutions corresponding to the cluster "login problems" to determine one or more solutions.

In some implementations, determining the one or more proposed solutions can include determining a confidence score associated with each of the one or more proposed solutions. The one or more proposed solutions can be ranked by their confidence scores, and the proposed solutions having the highest-ranked confidence scores can be selected. For example, a confidence score of 89 can represent an 89% chance that the proposed solution will succeed in correcting the problem. The solution engine 118, for example, may identify several possible solutions when accessing the associations 116 to identify a solution for a particular user feedback item 121. As an example, if ten possible solutions are identified, the solution engine 118 can assign confidence scores to each of the ten possible solutions that are based, for example, on the number of times that each of the possible solutions was used previously to solve problems identical or similar to the user feedback item 121. In some implementations, the solution engine 118 can select the highest-ranked solutions that were used at least a threshold number of times (e.g., at least a hundred). As a result, less then all (e.g., five or six) of the ten possible solutions can be selected.

In some implementations, a confidence score of a recommended solution can be based on the confidence of the classification of the user feedback item. In implementations using unsupervised clustering, the confidence score can correspond to a purity metric of the cluster. In implementations using classification-based clustering, the confidence score can correspond to a numeric classification confidence value provided by the classifier.

In some implementations, confidence scores can be provided to customer support representatives (CSRs) who can use the information to help in selecting from proposed solutions in order to identify solutions to provide to the user. In some implementations, confidence scores can be provided with the solutions that are presented to the user. For example, templatized predetermined responses can include "We think your problem will be solved by X (90% chance), but if not try Y and Z".

The at least one support solution is provided in response to the received new user feedback item (212). For example, the solution engine 118 can provide the one or more solutions (e.g., corresponding to the cluster "login problems.") to the support system 106 and/or the user device 102.

In some implementations, when a high confidence score exists that one or more particular solutions are applicable to a particular user feedback item, the solution engine 118 can provide the solution directly to the user device 102. In some implementations, the solution engine 118 can provide the solution to the support system 106 which can forward the solutions to the user device 102. In some implementations, a support user (e.g., a CSR) can review the one or more recommended solutions provided by the solution engine 118 and select one or more of the solutions (and/or provide some other solutions not recommended) to forward to the user device 102.

Figure 3:
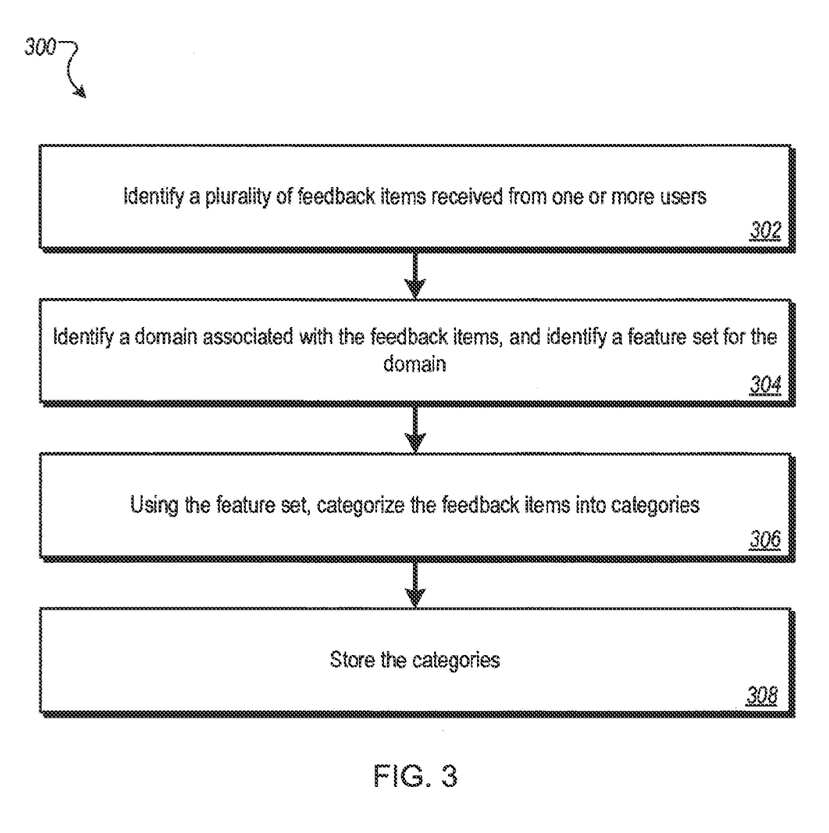
FIG. 3 is a flow chart of an example process for using a domain-specific feature set to categorize feedback items into categories.

FIG. 3 is a flow chart of an example process 300 for using a domain-specific feature set to categorize feedback items into categories. The process 300 includes stages that can be implemented as instructions and executed by one or more processors in one or more computer systems. In some implementations, the process 300 can be performed by the association engine 114. FIG. 1 is used for examples for the stages of the process 300.

Feedback items received from one or more users are identified (302). As an example, the identified feedback items can be the user feedback items 110 that are collected over time within the items-solutions model 108. In some implementations, the support systems 106 can store user feedback items 121 that are received from user devices 102.

A domain associated with the feedback items is identified, and a feature set is identified for the domain (304). One example domain can comprise one or more advertising system products, and the feature set can be specific to the advertising system products domain. The feature set in this example can include words and phrases that are specific to the advertising system products domain, e.g., that are contained in corresponding user feedback items. In some implementations, one or more domains can be associated with a single support system 106.

In some implementations, identifying the feature set can include identifying statistically important words or phrases using a term frequency-inverse document frequency (TF-IDF) analysis of the plurality of feedback items. For example, the TF-IDF score that is assigned to a word or phrase can be higher depending on how often the word or phrase appears is the corpus of feedback items. However, stop words such as "the" and "and," which may appear in virtually every feedback item, can be assigned a lower TF-IDF score.

In some implementations, identifying the feature set can include using one or more whitelists to identify words or phrases to include in the feature set. For example, the whitelist for the domain associated with an online advertising service can include words such as "ad," "campaign," "creative," "keyword," and so on.

In some implementations, the one or more whitelists can be generated automatically by analyzing domain-related documents. For example, computer applications can analyze a corpus of documents that correspond to a domain (e.g., call center manuals for an online advertising system), including searching the documents to identify most commonly-occurring words or phrases. The words or phrases that are not stop words can be added to the whitelist, e.g., discarding overly frequently-occurring words (e.g., "and," "the," etc.) and keeping the remaining words or phrases that have high frequencies.

In some implementations, identifying the feature set includes filtering words and phrases from the feature set to remove undesirable words or phrases using one or more blacklists. For example, the one or more blacklists can include one or more stop words (e.g., "the," "and," etc.), greetings (e.g., "Hello," "Dear," etc.), selected proper names (e.g., "Smith," "Jones" or any other names of people, agents, or CSR staff), common email boilerplate text (e.g., "from," "subject," "sincerely," etc.), email headers and footers, normalized Universal Resource Locators (URLs), monetary terms, help center page links, phone numbers, addresses, etc.

In some implementations, identifying the feature set includes evaluating each feedback item to determine words or phrases to include in the feature set and disregarding predetermined portions of feedback items based on regular expressions. For example, the disregarded portions of the feedback items include one or more of title, headers, or footers that can be detected using techniques involving regular expressions.

In some implementations, identifying the feature set includes identifying a sample of item responses that relate to the feedback items and extracting one or more terms for the feature set from the item responses. For example, a small percentage (e.g., 1% or less) of support solutions 112 can be analyzed, and frequently-occurring terms can be extracted. The feature set can be based on terms occurring with a high frequency (e.g., above a threshold), while disregarding terms that occur too frequently, such as stop words.

Using the feature set, the feedback items are categorized into categories (306). For example, the category engine 119 can cluster the feedback items into categories, where each category includes one or more clusters of related user feedback items. One example category for "login issues" can include user feedback issues related to "cannot login," "lost password," "password expired" and so on.

In some implementations, categorizing the feedback items can include using a machine learning system to categorize the feedback items. For example, unsupervised algorithms, including clustering algorithms, can detect similarities among related feedback items, including term relative frequencies and distributions.

In some implementations, categorizing can include determining categories based on one or more of a volume of feedback items, a number of unique post threads associated with the feedback items, a number of unique users who have posted the feedback items, and/or a number of unique addresses associated with the feedback items. For situations in which the systems discussed here collect personal information about users, the users may be provided with an opportunity to opt in/out of programs or features that may collect personal information (e.g., information about a user's preferences or a user's current location). User information that is used to identify unique users, unique addresses or other user-related history can be anonymized so that the privacy of users is protected. For example, quasi-unique identifiers can be associated with users, but the actual identifying information of the users is not stored. Additionally, any identified user interactions can be generalized (for example, generalized based on user demographics) rather than associated with a particular user. Encryption and obfuscation techniques can also be used to protect the privacy of users.

The categories are stored (308). For example, the category engine 119 can store the categories in the categories 120.

In some implementations, the categorized feedback items can be provided to assigned response providers. For example, categories associated with advertising system products can be provided to support systems 106 that are associated with online advertising systems.

In some implementations, as new user feedback items are received over time, a determination can be made whether the received new user feedback items are associated with a new category that has not been stored (e.g., in the categories 120). Over time, a growth in volume of the received new user feedback items can be monitored. When the growth in volume exceeds a pre-determined threshold (e.g., N number of instances within a time period T), the category engine 119 can categorize the received user feedback items into a new category, and the category engine 119 can store the new category in the categories 120.

Figure 4:
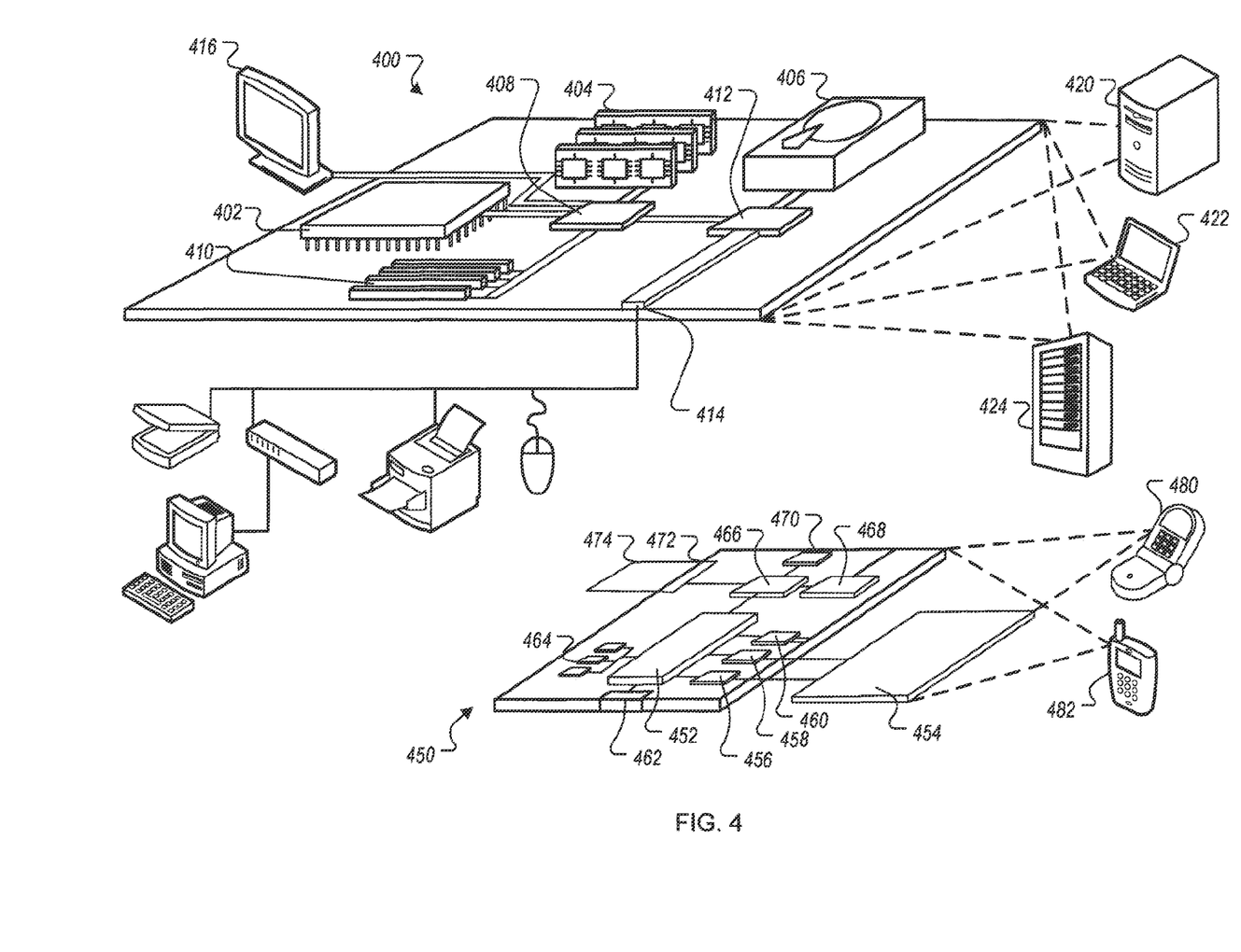
FIG. 4 is a block diagram of example computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In some implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In some implementations, the memory 404 is a computer-readable medium. In some implementations, the memory 404 is a volatile memory unit or units. In other implementations, the memory 404 is a non-volatile memory unit or units.

The storage device 406 is capable of providing mass storage for the computing device 400. In some implementations, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In some implementations, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In some implementations, the high-speed controller 408 is coupled to memory 404, display 416 (e.g., through a graphics processor or accelerator), and to high-speed expansion ports 410, which may accept various expansion cards (not shown). In some implementations, low-speed controller 412 is coupled to storage device 406 and low-speed expansion port 414. The low-speed expansion port, which may include various communication ports (e.g., USB, Bluetooth™, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, and an input/output device such as a display 454, a communication interface 466, and a transceiver 468, among other components. The device 450 may also be provided with a storage device, such as a Microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In some implementations, the memory 464 is a computer-readable medium. In some implementations, the memory 464 is a volatile memory unit or units. In some implementations, the memory 464 is a non-volatile memory unit or units. Expansion memory 474 may also be provided and connected to device 450 through expansion interface 472, which may include, for example, a SIM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hack able manner.

The memory may include for example, flash memory and/or MRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
    receiving user feedback items and corresponding support solutions;
    identifying, using clustering techniques, associations between the user feedback items and the corresponding support solutions wherein using clustering techniques includes filtering a corpus of user feedback items against a domain-specific dictionary;
    storing the identified associations as an items-solutions model that correlates the user feedback items with the corresponding support solutions;
    receiving a new user feedback item;
    automatically determining, using the items-solutions model, at least one support solution that corresponds to the new user feedback item; and
    providing the at least one support solution in response to the received new user feedback item.

2. The method of claim 1 where storing the identified associations further comprises identifying groups of related user feedback items sharing a support solution.

3. The method of claim 2 where identifying groups of related user feedback items sharing a support solution includes applying a term frequency analysis to the user feedback items and the support solutions to develop a mapping between user feedback items and one or more best-mapped support solutions.

4. The method of claim 1 where the support solutions comprise predetermined responses.

5. The method of claim 4 where the predetermined responses are organized by product and issue.

6. The method of claim 5 where the predetermined responses represent a library of most frequently presented solutions to customer problems presented in the user feedback items.

7. The method of claim 1 where one or more support solutions comprise a templatized message to a customer, describing a step-by-step solution to a specific customer problem.

8. The method of claim 7 where the templatized message is an email message.

9. The method of claim 7 where the templatized message comprises one or more placeholders to be filled based on attributes of a specific customer.

10. The method of claim 1 further comprising:
    receiving a new user feedback item;
    automatically determining a solution to the new user feedback item using the items-solutions model; and
    providing the determined solution responsive to the new user feedback item.

11. The method of claim 1 further comprising:
    receiving a new user feedback item;
    automatically determining one or more proposed solutions to the new user feedback item using the items-solutions model; and
    providing the determined one or more proposed solutions.

12. The method of claim 11 where automatically determining the one or more proposed solutions includes:
    determining a confidence score associated with each of the one or more proposed solutions; and
    ranking the one or more proposed solutions by their confidence scores;
    and where providing the determined one or more proposed solutions includes providing the one or more proposed solutions that have highest-ranked confidence scores.

13. The method of claim 11 where providing the determined one or more proposed solutions includes:
    providing, to a user, a description of the one or more proposed solutions;
    receiving, from the user, a selection of at least one solution from the one or more proposed solutions; and
    providing, in response to the received new user feedback item, the user-selected at least one solution.

14. A system comprising:
    a category engine for producing domain-specific categories using a corpus of user feedback items and a domain-specific dictionary;
    an association engine for:
        receiving user feedback items and corresponding support solutions;
        identifying, using clustering techniques and the domain-specific categories, associations between the user feedback items and the corresponding support solutions; and
        storing the identified associations as an items-solutions model that correlates the user feedback items with the corresponding support solutions; and
    a solution engine for:
        receiving a new user feedback item;
        automatically determining, using the items-solutions model, at least one support solution that corresponds to the new user feedback item; and
        providing the at least one support solution in response to the received new user feedback item.

15. A computer program product tangibly embodied in a computer-readable storage device and comprising instructions that, when executed by a processor, perform a method for providing content, the method comprising:
    receiving user feedback items and corresponding support solutions;
    identifying, using clustering techniques, associations between the user feedback items and the corresponding support solutions;
    storing the identified associations as an items-solutions model that correlates the user feedback items with the corresponding support solutions;
    receiving a new user feedback item;
    automatically determining, using the items-solutions model, at least one support solution that corresponds to the new user feedback item; and
    providing the at least one support solution in response to the received new user feedback item.

16. The computer program product of claim 15 where storing the identified associations further comprises identifying groups of related user feedback items sharing a support solution.

17. The computer program product of claim 16 where identifying groups of related user feedback items sharing a support solution includes applying a term frequency analysis to the user feedback items and the support solutions to develop a mapping between user feedback items and one or more best-mapped support solutions.

18. The computer program product of claim 15 where the support solutions comprise predetermined responses.

19. The computer program product of claim 18 where the predetermined responses are organized by product and issue.

20. The computer program product of claim 19 where the predetermined responses represent a library of most frequently presented solutions to customer problems presented in the user feedback items.

\* \* \* \* \*